Patented Sept. 19, 1933

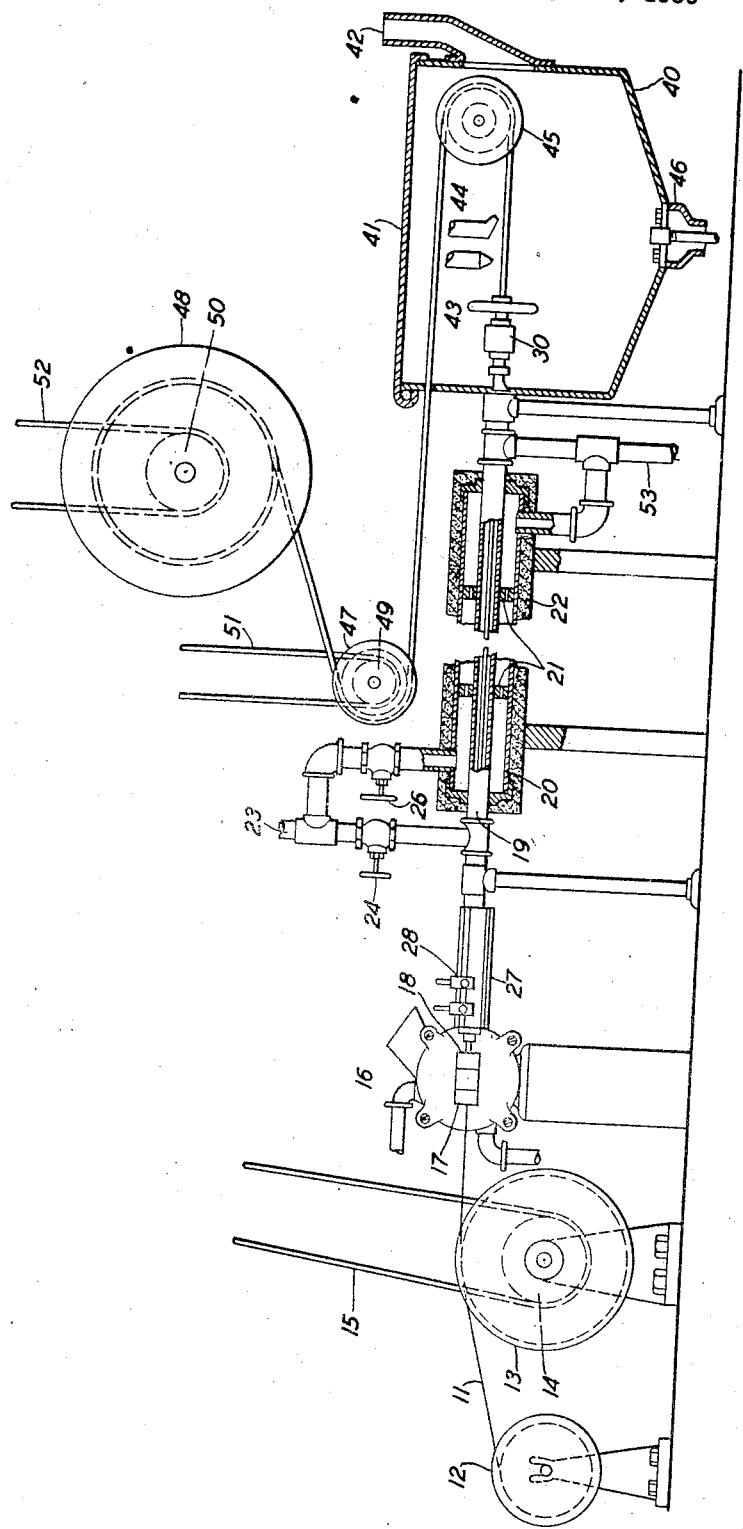

1,927,400

UNITED STATES PATENT OFFICE 1,927,400

METHOD OF APPLYING AND VULCANIZING AN INSULATING COMPOUND

Alvin N. Gray, Baltimore, Md., and Archie R. Kemp, Westwood, N. J., assignors to Bell Telephone Laboratories, Incorporated, New York, N. Y., a corporation of New York Original application August 11, 1930, Serial No. 474,364. Divided and this application October 29, 1932, Serial No. 640,239, and in Canada July 21, 1931

7 Claims. (Cl. 18—59)

This invention relates to a method of applying and vulcanizing an insulating compound and particularly to a method of continuously applying an insulating compound on a conducting core, this application being a divison of our copending application Serial No. 474,364 filed August 11, 1930.

In the manufacture of electrical conductors provided with an insulated covering of vulcanizable material it is common practice to extrude the insulating material about the bare conductor which is then coiled in a pan of soapstone or similar material to keep the turns of wire from sticking together. The pans of wire thus coiled are then placed in a vulcanizing chamber and subjected to heat and pressure until vulcanization is completed, after which the coils of insulated wire are cleaned and wound on supply reels. Such a process is objectionable not only because of the labor expense involved in the panning operation and the reeling after vulcanization, but also because of the time required and the tendency for the conducting core to become decentralized in its insulating sheath prior to vulcanization and for the insulating sheath to become distorted.

It is therefore an object of the present invention to provide an insulated electrical conductor in which the conducting core is surrounded by a uniform layer of insulating material vulcanized thereon at high speed and with a minimum amount of handling.

To attain this object in accordance with one feature of the invention a process is provided in which an insulating compound is extruded about a conducting core at high speed and comparatively low temperatures without causing vulcanization during the extruding operation and the compound is then rapidly vulcanized without causing decentralization of the core or distortion of the sheath.

In accordance with another feature of the invention the conductor about which the insulating compound is extruded passes directly from the extruding head to a vulcanizing chamber where it is subjected to steam at a pressure such that the coating is completely vulcanized in less than one minute as it passes continuously through the vulcanizing chamber.

These and other features of the invention will be more clearly understood from the following detailed description taken in connection with the attached drawing which illustrates suitable apparatus for extruding and vulcanizing a coating on a conductor in accordance with the invention.

Referring to the drawing the wire 11 which is to be covered is drawn from supply reel 12 by means of capstan 13 which is driven by means of pulley 14 and belt 15 from a source of power not shown. After making one turn about the capstan the wire enters the extruding head 16 which may be of any suitable type, a very satisfactory device being disclosed in U. S. Patent No. 1,770,985, granted to R. C. Kivley, July 22, 1930. Upon entering head 16 the wire passes through die 17, the opening in which is accurately finished and carefully aligned with the opening in die 18 through which the covered wire leaves the extruding chamber.

Directly adjoining the extruding head is the vulcanizing chamber which comprises an inner tube 19 of extra heavy steel pipe about 1½″ in diameter inside of a jacket 20 of extra heavy steel and about 2½″ diameter. These tubes are held concentric with respect to each other by means of spacing blocks 21—21 welded on the inner tube 19. Surrounding the outer steel tube 20 is a tube 22 of heat insulating material. Obviously the length of the vulcanizing chamber will depend upon the speed at which the covering is extruded on the wire as well as the vulcanizing temperature, but it has been found that very satisfactory results are obtained when the length of the chamber is 100 ft. and saturated steam is supplied at 170 to 175 pounds gauge pressure corresponding to vulcanizing temperatures between 375° F. and 378° F. Steam is admitted to the inner vulcanizing chamber through inlet 23 controlled by valve 24 and similarly the admission of steam to the outer tube is controlled by valve 26.

At the end of the vulcanizing chamber directly adjoining the extruding head there is provided a splicing box 27 equipped with a sliding door 28 which permits access to the wire as it leaves the extruding head for the purpose of splicing, inspection, etc. At the end of the chamber from which the coated conductor emerges there is provided a steam seal 30 preferably of the type disclosed in detail in Patent No. 1,689,205 of October 30, 1928 to L. F. Lamplough. This seal comprises a pair of rubber discs slightly cupped and backed up by a disc of spring steel, all having a number of radial slots and a compressed air cylinder operating a link motion which presses a brass member against a steel spring, thus insuring a tight seal about the wire. This seal is housed in an exhaust hood 40 provided with a hinged cover 41 and an exhaust pipe 42. A water nozzle 43 and an air nozzle 44 are provided, as shown, to supply jets of water and air to cool the wire before it passes around a sheave 45 and then in a horizontal direction parallel to and above the vulcanizing chamber. The exhaust hood is provided with a drain 46 for draining off condensed steam escaping past the seal and water from the nozzle 43. After passing about the sheave 45 the vulcanized wire passes directly above the vulcanizing chamber and after making a half turn about capstan 47 is wound on the take-up reel 48, the capstan and the take-up reel being provided with pulleys 49 and 50 respectively and driven by belts 51 and 52, from a source of power not shown. The vulcanizing chamber is not provided with idlers, but the wire is sufficiently lubricated by the water condensed therein. A steam trap 53 is provided for the purpose of removing excess water.

The rubber compound which is extruded about the wire 11 in extruding head 16 is carefully compounded in order to meet the exacting requirements of a continuous vulcanization process when carried on at high speeds. The preferred compound when used under the conditions to be specified, consists of the following ingredients in substantially the proportions named:

| | Percent |
|---|---|
| Smoked sheet rubber | 22 |
| Reclaimed rubber (boot and shoe) | 10 |
| Reclaimed rubber (whole tire) | 10 |
| Mineral rubber | 5 |
| Whiting | 44.7 |
| Zinc-oxide | 2.5 |
| Anti-oxidant | 1.5 |
| Sulphur | 1.0 |
| Softener (pine tar oil) | 3.0 |
| Ultra-accelerator | .3 |

The reclaimed rubber is specified primarily for the sake of economy and the percentage of such rubber to new rubber may be varied over a rather wide range so long as the total rubber content of the compound remains substantially 30%. The mineral rubber and pine tar oil which serve respectively as plasticizer and softener are present in such proportions as to give the compound the necessary plasticity and softness to permit it being extruded at high speeds while maintained at a relatively low temperature such that prevulcanization does not occur and, on the other hand, to have sufficient rigidity to preclude any possibility of decentralization of the core or distortion of the sheath before vulcanization. To further prevent decentralization of the core and to permit extruding and vulcanizing continuously at a high rate of speed an ultra-accelerator is employed in an amount to bring about complete vulcanization in a fraction of a minute when employed under the conditions to be described. Preferably the amount of ultra-accelerator present is 1% or more of the total rubber content and in no case should it be less than 0.9%. The term "ultra-accelerator" defines an accelerator such as tetramethylthiurammonosulphide or tetramethylthiuramdisulphide. Accelerators of this type have not been used heretofore in quantities such as specified for the purpose of vulcanizing or coating conductors and could not be so used in any process requiring pan vulcanization since such compounds to resist distortion in panning must be stiffer and extruded at higher temperatures which would result in prevulcanizing during mixing and extruding. The remaining ingredients of this compound are present for the same purpose as in common practice. The zinc-oxide activates the accelerator while the anti-oxidant resists ageing of the compound. Sulphur serves as the vulcanizing agent and whiting is used solely as a filler and consequently may be replaced by other fillers in commercial use.

In preparing this compound, all of the materials except the ultra-accelerator are masticated in a commercial type mixer and put through a strainer. The compound is then allowed to cool for a period of approximately ¾ of an hour instead of ageing for 48 hours as is the customary practice. The ultra-accelerator is then added in the warming rolls with just sufficient working to thoroughly mix it and the compound is used as soon thereafter as possible, which should always be within a period of two hours.

The vulcanizing compound may be fed into the extruding head 16 either by hand or by an automatic device of the intermittent type arranged to stop feeding whenever sufficient compound is in the machine. In order to prevent prevulcanization occurring in the extruding chamber, the head is preferably designed so that the compound is directed from the end of the extruding screw to an annular chamber around the wire, eliminating all pockets in which the compound may stand and become vulcanized before application to the wire. The temperature of the extruding head must be such as to give a definite compound sufficient plasticity without causing too rapid an action of the ultra-accelerator. With a compound as described, it has been found that these conditions are satisfactorily met if the extruding head is maintained at a temperature of approximately 160° F. which is considerably lower than used heretofore. This requirement is preferably met by means of an automatic regulator (not shown) which, by the circulation of steam and water respectively, heats and cools the extruding head to maintain the desired temperature.

By using the compound described under the conditions stated there is produced an improved type of electrical conductor. Not only is the core centralized with respect to the covering but the covering, per se, possesses superior mechanical and electrical properties. As a result of the exceedingly rapid vulcanization the rubber compound does not deteriorate to the extent that a similar compound does when subjected to a slow vulcanizing process. Furthermore, in producing this improved conductor the expense of handling, reeling, etc., inherent in pan vulcanizing methods, is eliminated; the process is continuous; and may be carried on at a high rate of speed limited practically only by the rate at which satisfactory extrusion is possible. For example, in coating No. 17 B & S gauge drop wire with a coating 3/64 of an inch thick, satisfactory results are obtained when the speed of travel of the wire is from 400 to 500 feet per minute. Since these results were obtained when using a vulcanizing chamber 100 feet in length, the corresponding vulcanizing periods for these speeds would be 12 to 15 seconds. Such a period of vulcanization is exceedingly small when compared with the vulcanizing periods used heretofore for the vulcanization of insulating compounds on electrical conductors and prevents to a considerable degree the deterioration which occurs in the rubber when a corresponding compound is vulcanized at the rate commonly employed in practice.

The specific compound described is one which is particularly suitable as the covering for "drop wire." Obviously, in order to provide an insulating sheath having different physical or electrical properties, or for other reasons, certain of the constituents of this compound may be replaced by equivalents or employed in varying amounts without departing from the spirit of the invention as defined in the appended claims.

What is claimed is:

1. The method of coating an article with an insulating compound which comprises extruding a vulcanizable compound thereupon at a temperature sufficiently low to prevent prevulcanization and immediately thereafter subjecting the coated article to a temperature which will cause substantially complete vulcanization in a period of time less than one minute.

2. The method of insulating an electrical conductor which comprises extruding a vulcanizable compound thereupon at a temperature of approximately 160° F. and immediately subjecting the coated conductor to a temperature corresponding to 170 to 175 pounds steam pressure to cause substantially complete vulcanization in a period of time less than one minute.

3. The method of insulating an electrical conductor which comprises extruding a vulcanizable compound thereupon at a temperature of approximately 160° F. and passing said conductor directly from the extruding head through a vulcanizing chamber maintained at a temperature corresponding to 170 to 175 pounds steam pressure to cause substantially complete vulcanization in approximately 15 seconds.

4. The method of coating an article with an insulating compound which comprises extruding thereon a coating of a compound containing rubber and an ultra-accelerator in which the amount of the untra-accelerator is not less than .9% of the rubber content of the compound, maintaining the compound while it is being extruded at a temperature sufficiently low to prevent prevulcanization, and immediately thereafter subjecting the coated article to a temperature which will cause substantially complete vulcanization of the compound in a period of time less than one minute.

5. The method of insulating an electrical conductor which comprises continuously extruding upon the conductor a coating of a compound containing rubber and an ultra-accelerator, the amount of ultra-accelerator present being not less than .9% of the rubber content of the compound and passing the coated conductor through a vulcanizing zone maintained at a temperature sufficiently high to vulcanize the compound upon the conductor in a period of time less than one minute.

6. The method of insulating an electrical conductor which comprises continuously extruding upon the conductor a coating of a compound containing rubber and an ultra-accelerator, the amount of the ultra-accelerator being not less than .9% of the rubber content of the compound, maintaining the compound while it is being extruded at a temperature sufficiently low to prevent prevulcanization, and passing the coated conductor through a vulcanizing zone maintained at a temperature sufficiently high to vulcanize the compound upon the conductor in a period of time less than one minute.

7. The method of insulating an electrical conductor which comprises continuously extruding a coating of an ultra-rapidly vulcanizing compound upon a conductor at a temperature sufficiently low to prevent prevulcanization of the compound, and continuously subjecting the coated conductor to a vulcanizing medium at a temperature sufficiently high to vulcanize the compound upon the conductor in a period of time less than one minute.

ALVIN N. GRAY.
ARCHIE R. KEMP.